United States Patent
Habermann et al.

(10) Patent No.: US 7,971,797 B2
(45) Date of Patent: Jul. 5, 2011

(54) THERMOSTAT VALVE

(75) Inventors: Rolf Habermann, Bergen (DE); Martin Rosenbecker, Schwuelper (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 380 days.

(21) Appl. No.: 12/373,533

(22) PCT Filed: Sep. 20, 2007

(86) PCT No.: PCT/IB2007/002741
§ 371 (c)(1),
(2), (4) Date: Jan. 13, 2009

(87) PCT Pub. No.: WO2008/035193
PCT Pub. Date: Mar. 27, 2008

(65) Prior Publication Data
US 2009/0250525 A1   Oct. 8, 2009

(30) Foreign Application Priority Data
Sep. 21, 2006   (DE) .......................... 10 2006 044 514

(51) Int. Cl.
*G05D 23/02* (2006.01)
(52) U.S. Cl. ...................... 236/93 A; 236/99 R; 251/368
(58) Field of Classification Search ................ 236/93 R, 236/93 A, 99 J, 99 K, 100; 251/259, 368
See application file for complete search history.

(56) References Cited

U.S. PATENT DOCUMENTS

| | | | |
|---|---|---|---|
| 3,797,805 A | 3/1974 | Nielsen | |
| 4,911,400 A | 3/1990 | Gruber | |
| 7,581,712 B2 * | 9/2009 | Yoshino et al. | ............... 251/331 |

FOREIGN PATENT DOCUMENTS

| | | |
|---|---|---|
| DE | 2055067 A1 | 5/1972 |
| DE | 2141082 A1 | 2/1973 |
| DE | 2305027 A1 | 8/1974 |
| DE | 3829830 A1 | 3/1990 |
| EP | 1183430 A2 | 4/2002 |
| EP | 1306594 A1 | 5/2003 |
| GB | 1083747 A | 9/1967 |
| GB | 2408310 A | 5/2005 |
| WO | 9819089 A1 | 5/1998 |

OTHER PUBLICATIONS

ISR for PCT/IB2007/002741 dated Feb. 18, 2008.

* cited by examiner

*Primary Examiner* — Marc E Norman
(74) *Attorney, Agent, or Firm* — Lowe Hauptman Ham & Berner LLP

(57) ABSTRACT

A thermostatic valve comprising a valve head and a flat, annular, elastomeric sealing element at the valve head, a valve spring mechanically biasing the valve member against a valve seat and a temperature-sensitive expansible element the valve member displacing the valve member against the valve spring, characterized by the valve head comprising at its circumference an annular groove, the flat annular sealing element being stamped out of an elastomer which swells in the presence of water, in particular an EPDM material, and exhibiting a thickness which is equal to or slightly less than the width of the annular groove.

8 Claims, 2 Drawing Sheets

THERMOSTAT VALVE

RELATED APPLICATIONS

Figure 1:
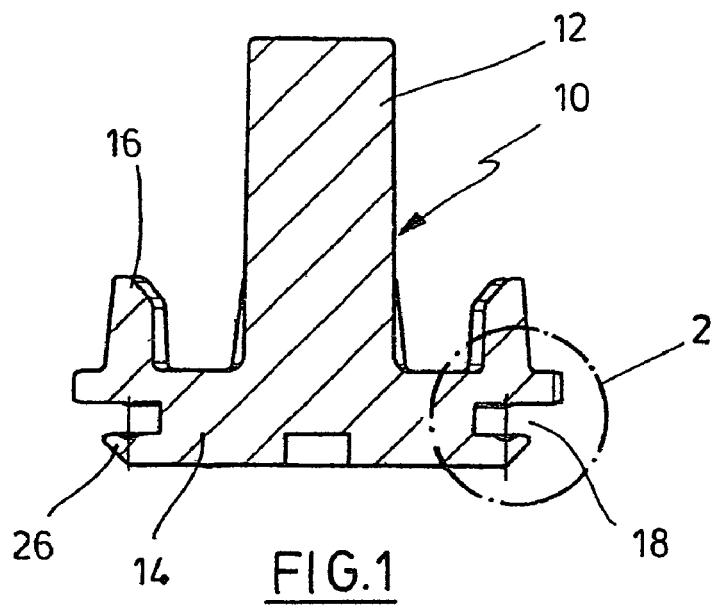

The present application is based on International Application Number PCT/IB2007/002741 filed Sep. 20, 2007, and claims priority from, German Application Number 10 2006 044 514.7, filed Sep. 21, 2006, the disclosures of which are hereby incorporated by reference herein in their entirety.

The present invention relates to a thermostatic valve defined in the preamble of claim 1.

Thermostatic valves are used foremost in automotive internal combustion-engine cooling systems. They control the flow of coolant through the engine's heat exchanger.

Conventionally such thermostatic valves comprise a valve head which is biased by a spring toward a valve seat and loaded on the opposite side by an expansible element in order to lift the valve head off the valve seat as a function of temperature. Sealing at the valve seat is implemented by a flat sealing annulus which in most cases is forced into position between two valve seats, such as flat annulus bodies. These valve seats are forced by screws toward each other. Typically the elastomeric flat sealing annulus is made separately by injection molding or it shall be molded in a two-component injection molding procedure to geometrically interlock with a valve head.

The objective of the present invention is to create a thermostatic valve allowing simple assembly and in particular it may be assembled in wholly automated manner, and entails fewer costs relating to the sealing element.

This problem is solved by the features of claim 1.

In the thermostatic valve of the present invention, the valve head is fitted at its circumference with an annular groove and the flat sealing element/annulus is stamped out of an elastomeric material, in particular an EPDM, which swells in the presence of water. The thickness of this sealing element is the same as or slightly less than the width of said annular groove.

Flat sealing annuli may be stamped very economically out of a flat, elastomeric material. Moreover such flat sealing annuli may be inserted in very simple manner into a valve head groove. Such a step may be entirely automated.

It is clear that during its assembly, the flat sealing annulus must have free access to said annular groove. On the other hand, the flat sealing annulus must be reliable kept inside said groove even when acted on by forces tending to dislodge it out of said groove, and therefore it is made of a material which, when in presence of a mixture of glycol and water—such as conventionally used in cooling systems—shall make said flat sealing annulus swell. Illustratively EPDM swells by about 15% by vol. when making contact with glycol/water. This increase in volume is adequate to jam the flat sealing annulus in the valve head, whereby, during piston operation, such dislodging forces are prevented from pulling said flat sealing annulus out of said groove.

In one embodiment mode of the present invention, the valve head is integrally made of plastic at least in the annular groove zone. In this manner the valve seat need not be manufactured being fitted with at least two valve seats.

In another embodiment mode of the present invention, the valve head is fitted at its free end facing the valve seat with a circumferentially conical bevel flaring toward the groove. The flat sealing annulus may be inserted in especially easy manner by means of said bevel into the annular groove.

In a further embodiment mode of the present invention, one wall of said groove comprises at least one elevation and the opposite wall a recess opposite said elevation. The elevation(s) and recess(es) may be annular or in the form of several mutually apart bosses and recesses. When the flat sealing annulus is made to swell, the said elevations and recesses will geometrically interlock and thereby the resistance to being dislodged shall be enhanced. Alternatively and in another embodiment mode of the present invention, at least one borehole may be constituted from the valve head's free end and run parallel to the valve head's axis and shall cross the groove. The flat sealing element is fitted with at least one hole of a diameter less than that of the borehole. Lastly a pin may be inserted into the borehole and made to pass through the flat sealing annulus' hole. In a further embodiment of the present invention, said pin may be made integral with the valve head. During assembly, the pin is separated by tool impact from the valve head and driven into the borehole, thereby affixing the flat sealing annulus into the valve head.

The invention is elucidated below in relation to the appended drawings.

Figure 2:
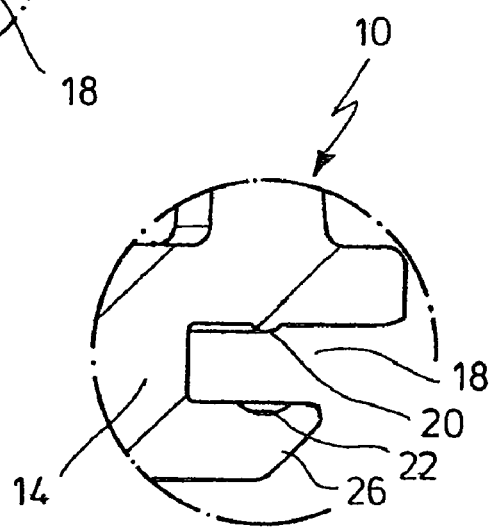
Figure 3:
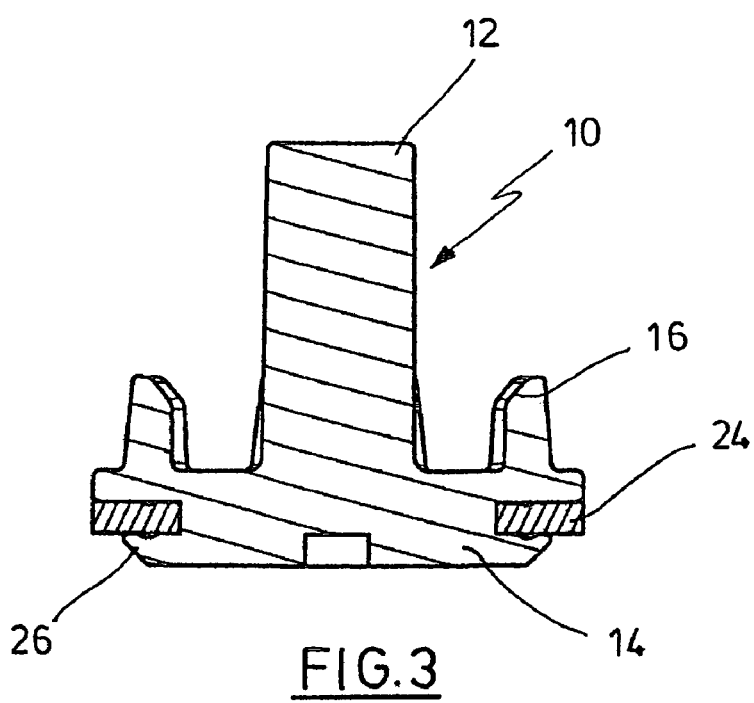
Figure 4:
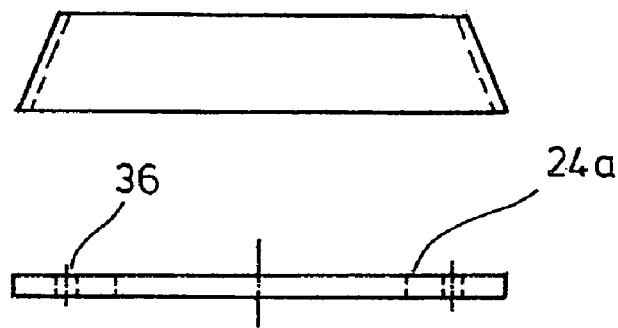
Figure 5:
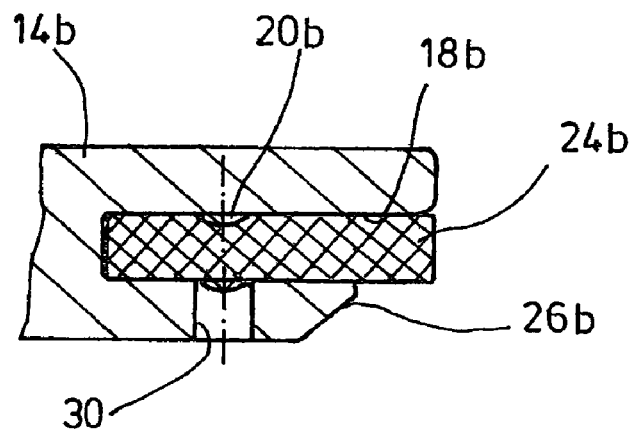
Figure 6:
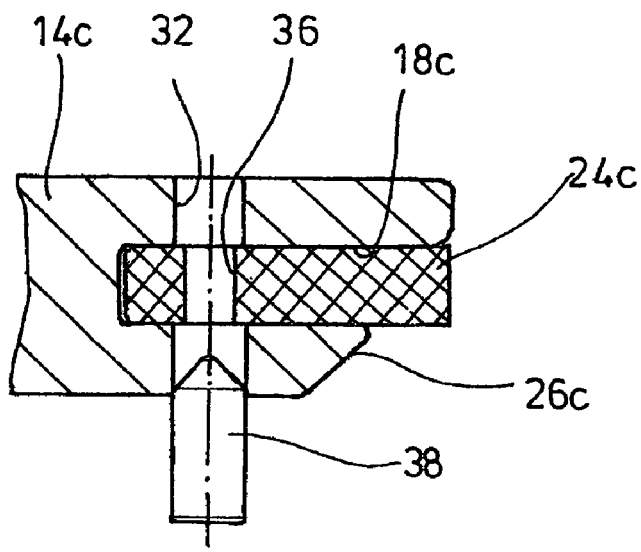

FIG. 1 is a cross-section of a valve member of a thermostatic valve devoid of a sealing element, FIG. 2 is an enlarged detail 2 of FIG. 1, FIG. 3 the valve member 10 of FIG. 1 fitted with a flat sealing element, FIG. 4 shows a flat sealing element in its relaxed state in the lower view and in a conical state in the upper view, FIG. 5 is a partial cross-section of the valve member head and of a sealing element, and FIG. 6 another embodiment mode in a partial cross-section of a valve member's valve head.

FIGS. 1 through 3 show a valve member 10 constituted by a tappet 12 and a valve head 14 that were manufactured integrally. Lateral protrusions 16 at the valve head 14 and spaced away from the tappet 12 bound an omitted valve spring pressing the valve member against an omitted valve seat. Basically such thermostatic valve designs are conventionally known and therefore will not be discussed in further detail; this also applies to an expansion element driving the valve member 10.

As further shown in FIGS. 1 and 2, the circular valve head comprises an annular groove at the circumference. As indicated in FIG. 2, one of the walls of the annular groove 18 is fitted with an annular elevation 20 and, oppositely the elevation 20, the other wall is fitted with a recess 22. The elevation 20 and the recess 22 may consist of a plurality of spaced discrete elevations (bumps) and recesses (bowls).

FIG. 3 shows how a washer-like sealing element 24 is seated in the annular groove 18. This flat sealing element 24 is an elastomer swelling in the presence of water. Illustratively it is an EPDM.

Such a flat sealing annulus is illustratively shown in the lower view of FIG. 4 and is denoted by 24*a*. As shown in the top view of FIG. 4, it may be forced into a conical element. When in that configuration, it may be very easily inserted manually, semi or fully automatically according to FIGS. 1 through 3 into the annular groove 18. The thickness of the flat sealing annulus 24, 24*a* when being assembled is equal to or slightly less than the width of the annular groove 18. After it swells, the flat sealing annulus 24, 24*a* is clamped into the annular groove 18, mechanical interlocking being assured by the elevation 20 and the recess 22, and as a result the flat sealing annulus 24, 24*a* is reliably kept in the annular groove 18.

In order that the flat sealing annulus 24, 24*a* may be more easily inserted into the annular groove 18, the valve head 14 is fitted near its free end with a circumferential conical surface 26 flaring toward the tappet 12.

In a variation relative to FIGS. 1 and 3, FIG. 5 shows an embodiment mode of a valve head 14*a* which is fitted with an annular groove 18*d* receiving a flat sealing annulus 24*b*. The flat sealing annulus 24*b* is identical with the sealing washer 24 or 24*a* of the other Figures. FIG. 5 again shows elevations 20*b* in one wall of the annular groove 18*b*. These elevations 20*b* are opposite boreholes 30 constituted from the free end into the valve head 14*b*. As the flat sealing annulus 24*b* is made to swell, its material also enters the borehole 30 and said flat sealing annulus then shall be kept in the annular groove 18*b* in mechanically interlocking manner.

In the embodiment mode shown in FIG. 6, a valve head 14*c* is fitted from the free end on with at least one borehole 32 running parallel to the axis of the valve head 14*c* and crossing the annular groove 18*c*. The flat sealing annulus 14, 20*c* is fitted with a hole 36 of which the diameter is smaller than that of the borehole 32. The valve head 14*c* is made by injection molding. A pin 38 is molded simultaneously with said head and is connected in to the valve head 14*c* while being severable from it at the borehole 32. After the flat sealing annulus 24*c* has been assembled in the above described manner, an impacting tool is used to sever the pin 38 from the valve head 14*c*, and the pin is then driven through the hole 36 and into the borehole 32 in order to reliably keep the flat sealing annulus 24*c* in the valve head against forces tending to dislodge said flat sealing annulus out of said groove.

The invention claimed is:

1. A thermostatic valve comprising a valve head and a flat, annular, elastomeric sealing element at the valve head, a valve spring mechanically biasing the valve member against a valve seat and a temperature-sensitive expansible element the valve member displacing the valve member against the valve spring, characterized by the valve head comprising at its circumference an annular groove the flat annular sealing element being stamped out of an elastomer which swells in the presence of water, in particular an EPDM material, and exhibiting a thickness which is equal to or slightly less than the width of the annular groove.

2. Thermostatic valve as claimed in claim 1, characterized in that the valve head is molded integrally, preferably from plastic.

3. Thermostatic valve as claimed in claim 2, characterized in that the pin is integrated into the valve head in a manner to be severable from it.

4. Thermostatic valve as claimed in claim 1, characterized in that the valve head is fitted at its free end facing the valve seat with a circumferential conical surface which flares toward the groove.

5. Thermostatic valve as claimed in claim 1, characterized in that one wall of the groove is fitted with at least one elevation and the opposite wall of the groove is fitted with a recess opposite said elevation.

6. Thermostatic valve as claimed in claim 5, characterized in that the elevation and the recess are annular.

7. Thermostatic valve as claimed in claim 5, characterized in that at least one borehole runs from the free end of the valve head parallel to the axis of said seat, said borehole crossing the groove, the flat sealing annulus being fitted with at least one hole of which the diameter is less than that of the borehole and in that a pin is used which can be inserted into the borehole and may pass through the hole.

8. Thermostatic valve as claimed in claim 1, characterized in that the valve head comprises a borehole fashioned into the free end of this valve head.

* * * * *